United States Patent
Mokulys et al.

(10) Patent No.: US 11,187,090 B2
(45) Date of Patent: Nov. 30, 2021

(54) MOVING BLADE OF A TURBO MACHINE AND METHOD FOR PRODUCING THE SAME

(71) Applicant: MAN Energy Solutions SE, Augsburg (DE)

(72) Inventors: Thomas Mokulys, Xanten (DE); Viktor Salit, Dinslaken (DE)

(73) Assignee: MAN Energy Solutions SE, Augsburg (DE)

( * ) Notice: Subject to any disclaimer, the term of this patent is extended or adjusted under 35 U.S.C. 154(b) by 17 days.

(21) Appl. No.: 16/761,306

(22) PCT Filed: Oct. 30, 2018

(86) PCT No.: PCT/EP2018/079672
§ 371 (c)(1),
(2) Date: May 4, 2020

(87) PCT Pub. No.: WO2019/105672
PCT Pub. Date: Jun. 6, 2019

(65) Prior Publication Data
US 2021/0189888 A1    Jun. 24, 2021

(30) Foreign Application Priority Data
Nov. 29, 2017  (DE) .................. 10 2017 128 261.0

(51) Int. Cl.
*F01D 5/28*    (2006.01)
*F01D 5/14*    (2006.01)

(52) U.S. Cl.
CPC ............. *F01D 5/28* (2013.01); *F01D 5/14* (2013.01); *F05D 2220/30* (2013.01); *F05D 2230/10* (2013.01); *F05D 2230/25* (2013.01); *F05D 2230/30* (2013.01)

(58) Field of Classification Search
CPC ... F01D 5/28; F01D 5/14; F01D 5/147; F05D 2220/30; F05D 2230/10; F05D 2230/25; F05D 2230/30; B23K 2103/10; B23K 2103/14; B23K 2103/04; B23K 2101/001; B23K 26/342; F04D 29/023; F04D 29/324; B23P 15/02
See application file for complete search history.

(56) References Cited

U.S. PATENT DOCUMENTS 4,655,855 A * 4/1987 Levin ..................... C22F 1/183
                                                            148/514
2007/0160469 A1    7/2007 Ochiai et al.
2011/0217178 A1    9/2011 Mazzola

FOREIGN PATENT DOCUMENTS

| DE | 1551176 |  | 1/1970 | |
| DE | 1551176 A1 | * | 1/1970 | ............... F01D 5/28 |
| DE | 102006058949 A1 | * | 6/2008 | ............... B22F 5/04 |
| DE | 102015107766 |  | 12/2015 | |
| EP | 1944465 |  | 7/2008 | |

* cited by examiner

*Primary Examiner* — Jacob M Amick
*Assistant Examiner* — Charles J Brauch
(74) *Attorney, Agent, or Firm* — Cozen O'Connor

(57) ABSTRACT

A rotor blade of a turbomachine, having a blade root, a blade airfoil which has a flow leading edge, a flow trailing edge, and flow-guiding surfaces extending between the flow leading edge and the flow trailing edge. The blade root and a radially inner section of the blade airfoil are made of a steel material, and a radially outer section of the blade airfoil is made of a more lightweight material.

13 Claims, 3 Drawing Sheets

MOVING BLADE OF A TURBO MACHINE AND METHOD FOR PRODUCING THE SAME

CROSS REFERENCE TO RELATED APPLICATIONS

This is a U.S. national stage of Application No. PCT/EP2018/079672 filed Oct. 30, 2018. Priority is claimed on German Application No. DE 10 2017 128 261.0 filed Nov. 29, 2017 the content of which is incorporated herein by reference.

BACKGROUND OF THE INVENTION

1. Field of the Invention

The invention relates to a moving blade of a turbo machine. The invention, furthermore, relates to a method for producing such a moving blade.

2. Description of Related Art

In turbo machines, such as for example in steam turbines, gas turbines, compressors, or the like, moving blades on the one hand and guide blades on the other hand are employed. Guide blades are stator-side, fixed blades. Moving blades are rotor-side blades, i.e. blades rotating together with a shaft.

A moving blade of a turbo machine comprises a blade root and a blade leaf. The blade root serves for mounting the moving blade to a shaft or to a rotor basic body. Emanating from the blade root, the blade leaf extends radially to the outside. The blade leaf of a moving blade comprises a flow leading edge, a flow trailing edge and flow-guiding surfaces, which extend between the flow leading edge and the flow trailing edge. Radially outside, the moving blade is typically delimited by a blade tip.

Moving blades known from practice are assemblies which are produced either by milling or forging.

There is a need for producing moving blades with lower weight.

SUMMARY OF THE INVENTION

One aspect of the invention is a new type of moving blade of a turbo machine and a method for producing such a moving blade.

According to one aspect of the invention, the blade root and a radially inner section of the blade leaf are produced from a steel material. A radially outer section of the blade leaf is produced from a lighter material. According to one aspect the invention present here a moving blade of a turbo machine is proposed for the first time, whose blade leaf is produced in a radially inner section from a steel material and in a radially outer section from a lighter material. The lighter material is a light metal alloy material or a ceramic material or a combination thereof. By way of this, moving blades of turbo machines can be produced with lower weight. It is pointed out here that the inner section of the blade leaf and the outer section are connected in a firmly bonded and not only for example in a positive-locking manner.

According to an advantageous further development, a transition region is formed between the radially inner section of the blade leaf and the radially outer section of the blade leaf, which is produced from a mixture of the steel material and of the light metal alloy material. Providing such a transition region between the radially inner section and the radially outer section allows a particularly advantageous joining of the radially outer section to the radially inner section of the blade leaf.

According to an advantageous further development, the radially inner section in the region of the flow leading edge emanating from the blade root extends up to a minimum of 10% and a maximum of 98%, preferably up to a maximum of 60%, particularly preferably up to a maximum of 50% of the radial height of the blade leaf. In the region of the flow trailing edge, the radially inner section, emanating from the blade root, extends up to a minimum of 10% and a maximum of 98%, preferably up to a maximum of 60%, particularly preferably up to a maximum of 50% of the radial height of the blade leaf. By way of this it is possible to produce moving blades with a low weight.

Preferentially, the radially inner section of the blade leaf in the region of the flow leading edge has a smaller and thus the radially outer section of the blade leaf in the region of the flow leading edge a greater radial extension than in the region of the flow trailing edge. This further development of the invention is based on the realisation that in the region of the flow leading edge for improving an erosion resistance the radially outer section should be moved further to radially inside than in the region of the flow trailing edge.

According to an advantageous further development, a material notching and/or a material thickening is formed in a transition region between the radially inner section of the blade leaf and the radially outer section of the blade leaf. By way of the material notching and/or material thickening in the transition region, the erosion protection can be further improved.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

The invention relates to a moving blade of a turbo machine. A moving blade of a turbo machine comprises a blade root and a blade leaf. The blade root serves for connecting the moving blade to a rotor basic body or a shaft.

Figure 1:
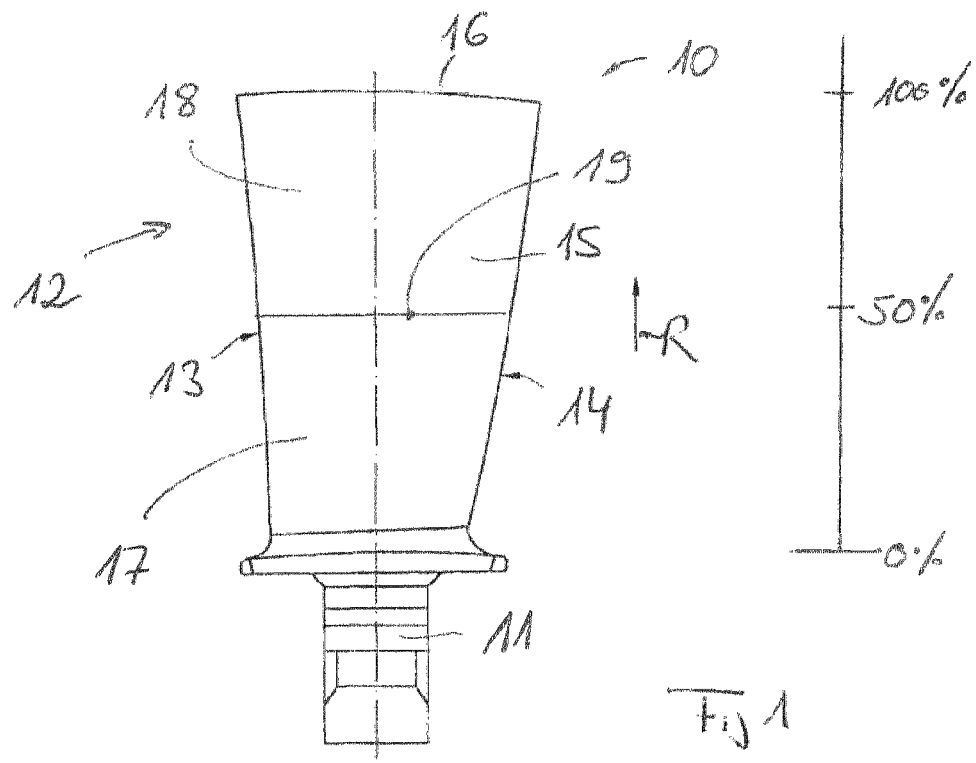
FIG. 1 is a schematized representation of a moving blade.

FIG. 1 shows a first exemplary embodiment of a moving blade 10 of a turbo machine according to one aspect of the invention. The turbo machine 10 comprises a blade root 11 and a blade leaf 12. The blade leaf 12 comprises a flow leading edge 13, a flow trailing edge 14 and flow-guiding surfaces 15, which extend between the flow leading edge 13 and the flow trailing edge 14. One of these flow-guiding surfaces 15 is embodied as pressure side and the other one as suction side.

Viewed from the blade root 11, which serves for mounting the moving blade 10 to a shaft or to a rotor basic body, the blade leaf 12, which serves for the flow guiding, has a radial height or an extension in the radial direction R, wherein directly adjoining the blade root 11 the radial extension of the blade leaf 12 amounts to 0% and radially outside in the region of a blade tip 12 the radial extension of the blade leaf 12 amounts to 100%.

In terms of one aspect of the invention present here, the blade root 11 and a radially inner section 17 of the blade leaf 12 are produced from a steel material, i.e. from an iron alloy material. A radially outer section 18 of the blade leaf 12 is produced from a light metal alloy material.

A transition region 19 between the radially inner section 17 of the blade leaf 12 and the radially outer section 18 of the same is formed linearly in FIG. 1.

In the exemplary embodiment of FIG. 1, radially inner section 17 of the blade leaf 12 extends in the region of the flow leading edge 13 and in the region of the flow trailing edge 14, emanating from the blade root 11, as far as to approximately 50% of the radial height of the blade leaf 12.

Deviating from this, the radial extension of the radially inner section 17 and thus of the radially outer section 18 in the region of flow leading edge 13 and flow trailing edge 14 can also be different.

The light metal alloy material of the radially outer section 18 of the blade leaf 12 is preferentially an aluminium alloy material or a titanium alloy material.

Figure 2:
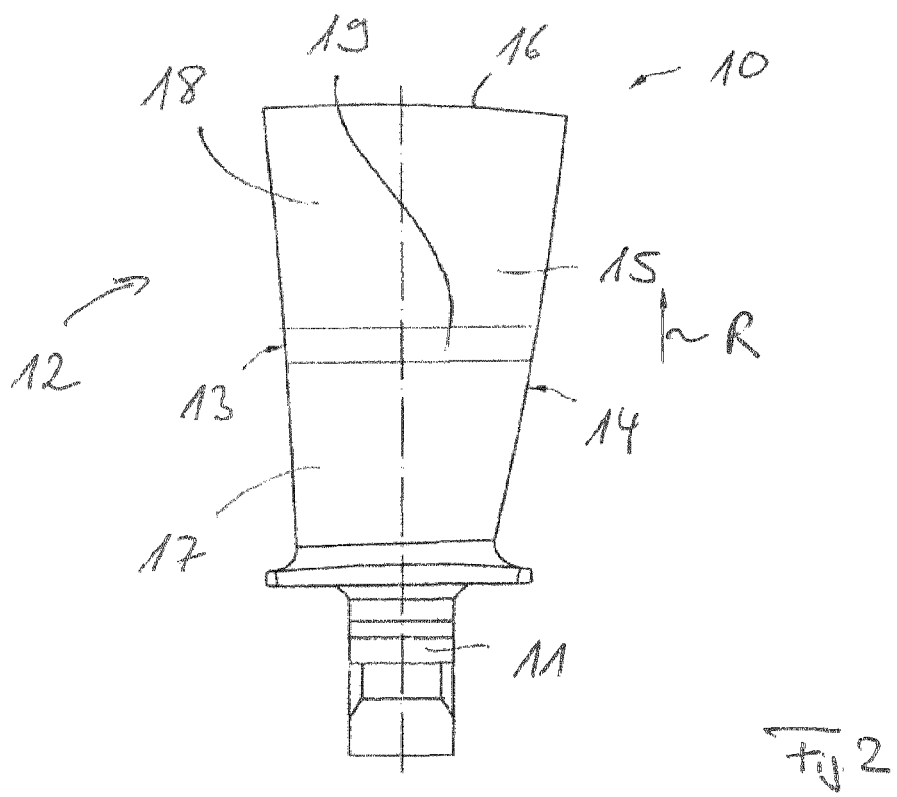
FIG. 2 is a schematized representation of a moving blade.

In the exemplary embodiment of FIG. 2, a transition region 19 is formed between the radially inner section 17 and the radially outer section 18 of the blade leaf 12, which transition region 19 consists of a mixture of the steel material and of the light metal alloy material.

Preferentially, the mixing ratio in the transition region 19 changes, namely in such a manner that in the transition region 19 the portion of the steel material decreases from radially inside to radially outside and the portion of the light metal alloy material increases. By way of this, a particularly advantageous joining of radially outer section 18 and radially inner section 17 of the blade leaf 12 over the transition region 19 can be ensured.

Figure 3:
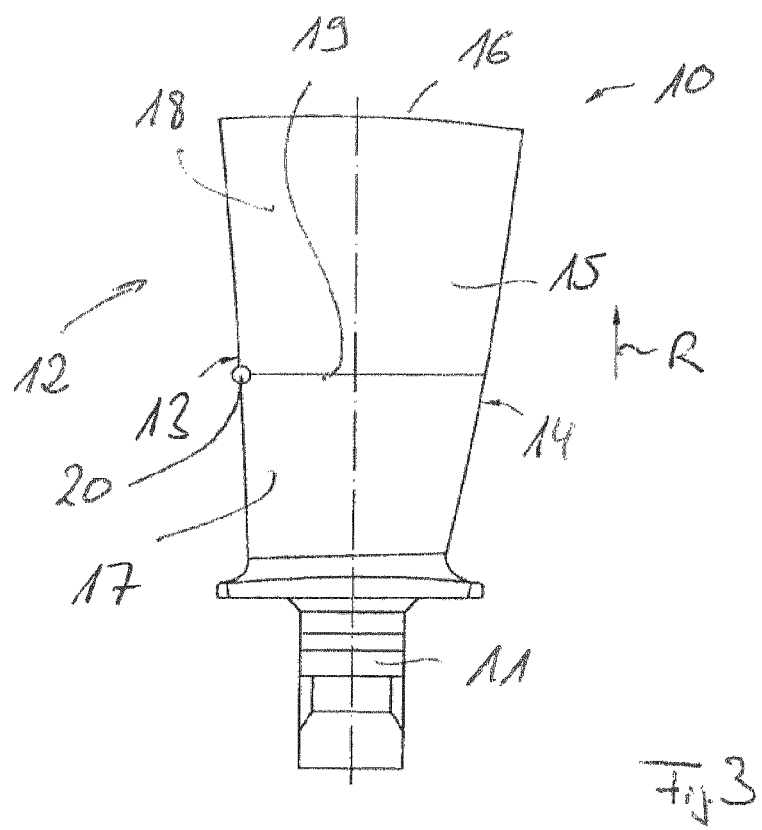
FIG. 3 is a schematized representation of a moving blade.

FIG. 3 shows a further development of the exemplary embodiment of FIG. 1, in which in the region of the transition region 19 a material thickening 20 is formed, namely at least in the region of the flow leading edge 13. This material thickening 20 can also extend into the region of the suction side and/or the pressure side and/or the flow trailing edge 14.

Figure 4:
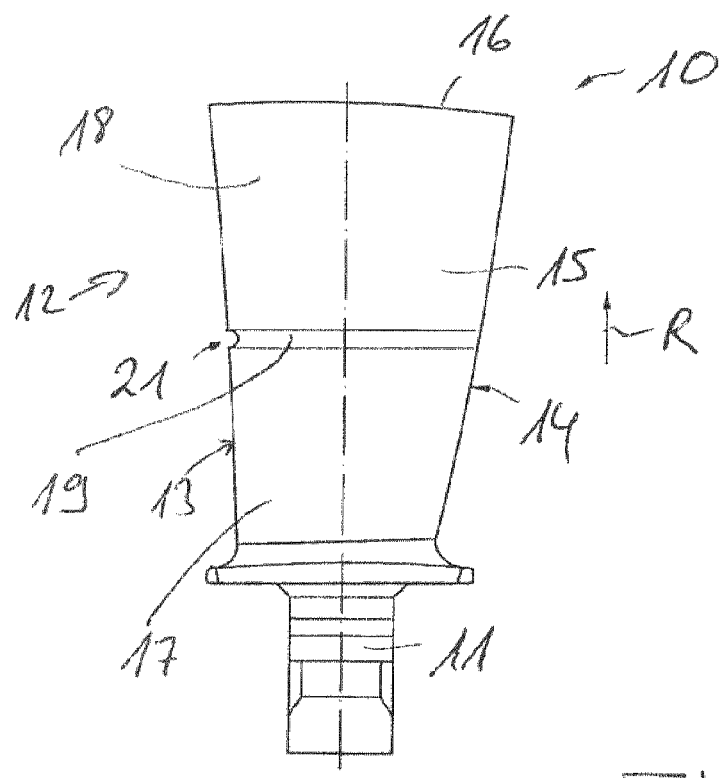
FIG. 4 is a schematized representation of a moving blade.

In contrast with such a material thickening 20, which is formed in the exemplary embodiment of FIG. 3, a material recess 21 can also be formed in the transition region 19, as is shown in FIG. 4. Here, the material recess 21 is formed at least in the region of the flow leading edge 19 and can also extend into the region of the suction side and/or the pressure side and/or the flow trailing edge 14.

In the exemplary embodiments of FIGS. 1, 2, 3, and 4, the radially inner section 17 of the blade leaf 12 and the radially outer section 18 of the blade leaf 12 each have a same-size radial extension in the region of the flow leading edge 13 and the flow trailing edge 14.

Preferentially, the radial extension of the radially inner section 17 is then around a minimum of 30% and a maximum of 70%, preferably about a minimum of 30% and a maximum of 60%, particularly preferably about a minimum of 30% and a maximum of 50% of the radial extension of the blade leaf 12.

Figure 5:
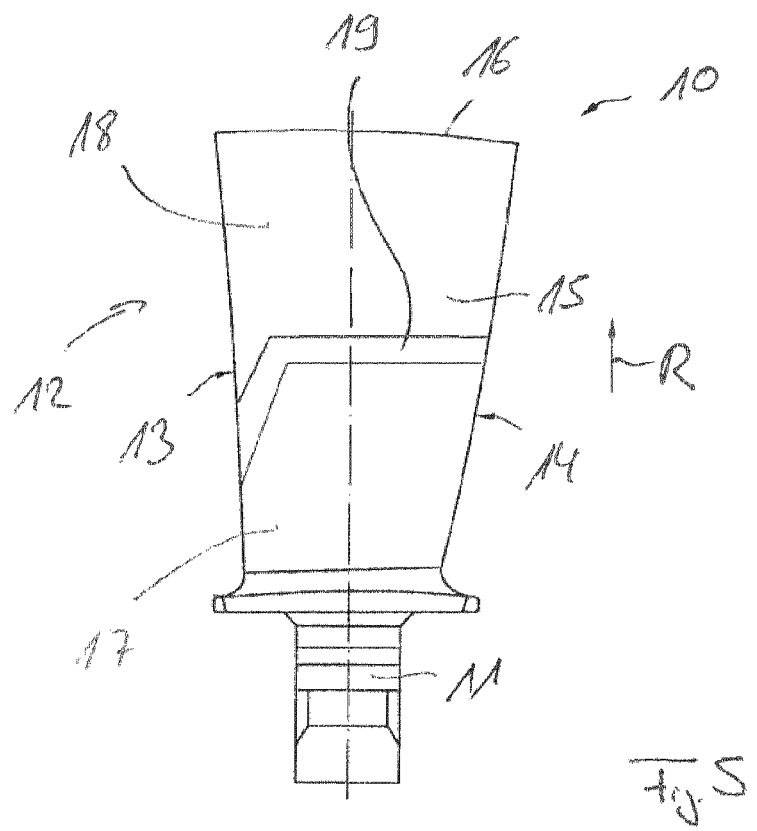
FIG. 5 is a schematized representation of a moving blade.
Figure 6:
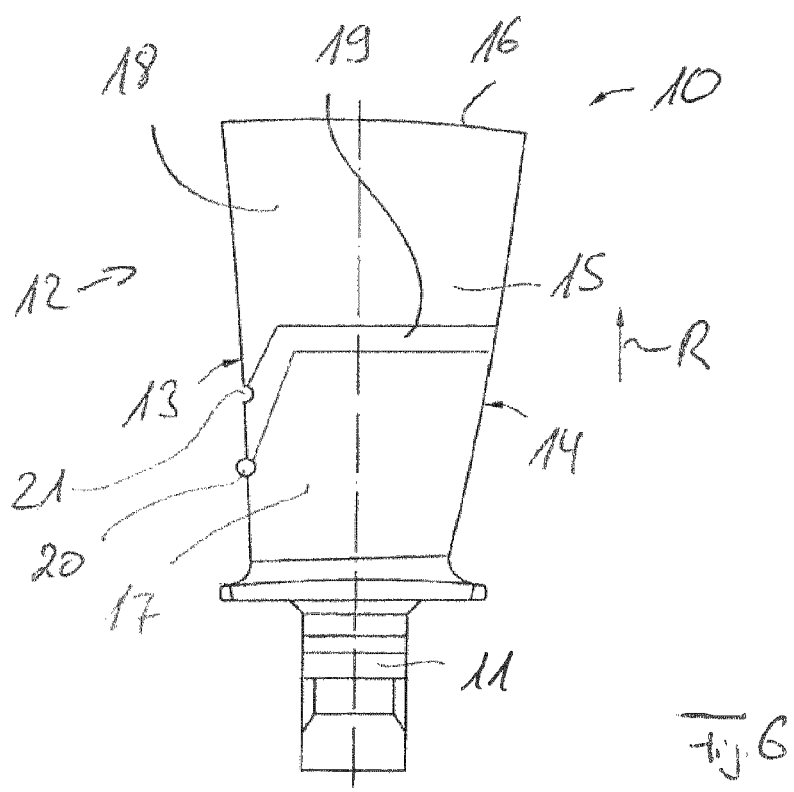
FIG. 6 is a schematized representation of a moving blade.

FIGS. 5 and 6 show exemplary embodiments of the invention, in which the radial extension of the radially inner section 17 and of the radially outer section 18 are distinct in the region of the flow leading edge 17 and the flow trailing edge 14. Thus, the radially inner section 17 in the region of the exemplary embodiments of FIGS. 5 and 6, the radially inner section 17 of the blade leaf has a smaller extension in the region of the flow leading edge 13 and thus the radially outer section 18 in the region of the flow leading edge 13 a greater extension than in the region of the flow trailing edge 14.

Between these portions 17, 18 of the blade leaf 12 in FIGS. 5 and 6, transition regions 19 each are formed in which preferentially the composition of the mixture of the steel material and the light metal alloy material again changes.

In the exemplary embodiment of FIG. 6, both a material thickening 20 and also a material recess 21 are formed in the region of the flow leading edge 13 in the transition region 19, namely a material recess 21 in the transition region 19 adjacent to the radially outer section 18 and a material thickening 20 in the transition region 19 adjacent to the radially inner section 17.

In terms of one aspect of the invention, a moving blade 10 of a turbo machine is accordingly proposed, in which the blade root 11 and a radially inner section 17 of the blade leaf 12 are produced from steel, preferentially by way of milling or forging. The radially inner section 17 of the blade leaf 12, which is produced from steel, is followed either directly or subject to forming a transition region 19 that preferentially changes in terms of its composition, by the radially outer section 18 of the blade leaf 12, which is produced from the light metal alloy material. Depositing this radially outer section 18 of the blade leaf 12 on the radially inner section 17 of the same is preferentially effected by way of a generative manufacturing method such as laser sintering or laser deposition welding.

During the formation of a transition region 19 with changing mixture of steel and light metal alloy material, the composition of the material to be deposited is then gradually changed during the application of the generative manufacturing method.

By using a lighter material on the radially outer section 18 of the moving blade 10, lower forces act on the blade root 11 during high circumferential velocities. Because of this, the blade root 11 is relieved and the blade roots 11 can be embodied shorter.

According to one aspect of the invention, the erosion resistance of the moving blades can be improved in particular also in the region of the flow leading edge 13.

One aspect of the invention, furthermore, relates to a method for producing such a moving blade 10. Initially, the blade root 11 and the radially inner section 17 of the blade leaf 12, which are produced from the steel material, are produced by way of milling or forging. Following this, the radially outer section 18 of the blade leaf 12, which is produced from the light metal alloy material, is deposited on the radially inner section 17 of the blade leaf 12 through a generative manufacturing method. Preferentially laser sintering or laser deposition welding is used as generative manufacturing method.

A section plane of the radially inner section 17, onto which the radially outer section 18 is deposited, is preferentially embodied planar or flat. In the exemplary embodiment of FIGS. 5 and 6, the section plane is composed of two planar or flat part portions which are inclined relative to one another.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A moving blade of a turbo machine, comprising:
  a blade root; and
  a blade leaf comprising a flow leading edge, a flow trailing edge, and flow-guiding surfaces extending between the flow leading edge and the flow trailing edge;
  wherein:
  the blade root and a radially inner section of the blade leaf are produced from a steel material;
  a radially outer section of the blade leaf is produced from a light metal alloy material that is a lighter material as compared to the steel material;
  a transition region between the radially inner section of the blade leaf and the radially outer section of the blade leaf; and
  a material recess formed in the transition region,
  wherein the radially outer section of the blade leaf, which is produced at least in part from a light metal alloy material, is deposited on the radially inner section of the blade leaf by a generative manufacturing method.

2. The moving blade according to claim 1, wherein the lighter material is a light metal alloy material or a ceramic material or a combination thereof.

3. The moving blade according to claim 1, further comprising:
  a transition region is formed between the radially inner section of the blade leaf and the radially outer section of the blade leaf, which is produced from a mixture of the steel material and at least the light metal alloy material.

4. The moving blade according to claim 1, wherein in a region of the flow leading edge, the radially inner section emanating from the blade root extends up to a minimum of 10% to a maximum of at least one of 98%, 60%, and 50% of a radial height of the blade leaf.

5. The moving blade according to claim 1, wherein in a region of the flow trailing edge, the radially inner section, emanating from the blade root, extends up to a minimum of 10% and maximum of at least one of 98%, 60%, and 50% of a radial height of the blade leaf.

6. The moving blade according to claim 1, wherein the radially inner section of the blade leaf and the radially outer section of the blade leaf have a same size radial extensions in a region of the flow leading edge and the flow trailing edge.

7. The moving blade according to claim 1, wherein the radially inner section of the blade leaf in a region of the flow leading edge has a smaller and thus the radially outer section of the blade leaf in the region of the flow leading edge a greater radial extension than in a region of the flow trailing edge.

8. The moving blade according to claim 1, wherein the radially inner section of the blade leaf in the region of the flow leading edge has a greater and thus the radially outer section of the blade leaf in the region of the flow leading edge a smaller radial extension than in the region of the flow trailing edge.

9. The moving blade according to claim 1, further comprising:
  a material thickening formed in the transition region.

10. The moving blade according to claim 9, wherein the material recess and/or the material thickening is formed at least in the region of the flow leading edge.

11. A method for producing a moving blade comprising:
  producing from a steel material by at least one of milling or forging a blade root and a radially inner section of a blade leaf; and
  depositing on the radially inner section of the blade leaf through a generative manufacturing method a radially outer section of the blade leaf, which is produced from a light metal alloy material,
  wherein a transition region is formed between the radially inner section of the blade leaf and the radially outer section of the blade leaf; and
  forming a material recess in the transition region.

12. The method according to claim 11, wherein the generative manufacturing method is at least one of laser sintering and laser deposition welding.

13. The moving blade according to claim 9, wherein at least one of the material recess and the material thickening extends into a region of a suction side and/or a pressure side and/or a flow trailing edge of the blade leaf.

* * * * *